US008832312B2

(12) United States Patent
Tanji (10) Patent No.: US 8,832,312 B2
(45) Date of Patent: Sep. 9, 2014

(54) COMMUNICATION APPARATUS AND COMMUNICATION CONTROL METHOD

(75) Inventor: Masamichi Tanji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1147 days.

(21) Appl. No.: 11/396,791

(22) Filed: Apr. 3, 2006

(65) Prior Publication Data

US 2006/0224774 A1 Oct. 5, 2006

(30) Foreign Application Priority Data

Apr. 5, 2005 (JP) ................................. 2005-109221

(51) Int. Cl.
| G06F 15/16 | (2006.01) |
| G06F 15/177 | (2006.01) |
| H04L 29/12 | (2006.01) |
| G06F 3/12 | (2006.01) |

(52) U.S. Cl.
CPC .... *H04L 29/12009* (2013.01); *H04L 29/12018* (2013.01); *G06F 3/1286* (2013.01); *G06F 3/1231* (2013.01); *H04L 61/10* (2013.01)
USPC ....... 709/245; 709/227; 709/222; 370/395.54

(58) Field of Classification Search
CPC ................... H04L 29/12009; H04L 29/12018; H04L 61/10; G06F 3/1286; G06F 3/1231
USPC ................ 709/220–222, 245, 249, 250, 227; 370/395.54, 401, 402
See application file for complete search history.

(56) References Cited

U.S. PATENT DOCUMENTS

| 5,708,654 | A | * | 1/1998 | Arndt et al. .................... 370/242 |
| 5,774,665 | A | | 6/1998 | Jeong et al. |
| 5,894,479 | A | * | 4/1999 | Mohammed ................... 370/401 |
| 6,747,979 | B1 | * | 6/2004 | Banks et al. ................... 370/401 |
| 6,895,443 | B2 | * | 5/2005 | Aiken .............................. 709/245 |
| 7,046,666 | B1 | * | 5/2006 | Bollay et al. ................... 370/392 |
| 7,088,727 | B1 | * | 8/2006 | Short et al. ..................... 370/401 |
| 7,286,252 | B2 | * | 10/2007 | Kawabuchi et al. ......... 358/1.15 |
| 7,337,238 | B2 | * | 2/2008 | Nishio ............................ 709/245 |
| 7,512,136 | B2 | * | 3/2009 | Korotin ........................... 370/401 |
| 7,552,478 | B2 | * | 6/2009 | Seki et al. ......................... 726/23 |

(Continued)

FOREIGN PATENT DOCUMENTS

| JP | A 06-214929 | 8/1994 |
| JP | 09-064900 A | 3/1997 |

(Continued)

OTHER PUBLICATIONS

May 11, 2009 Japanese Office Action that issued in Japanese Patent Application No. 2005-109221.

(Continued)

*Primary Examiner* — Gregory Todd
(74) *Attorney, Agent, or Firm* — Cowan, Liebowitz & Latman, P.C.

(57) ABSTRACT

If an address-resolution request message is received from a data processing terminal via an interface connected to the data processing terminal, it is determined whether a physical address corresponding to a target network address of the address-resolution request message has already been registered. If it has been registered, then an address-resolution response message containing the corresponding physical address is created and the created message is transferred to a terminal via the interface.

5 Claims, 9 Drawing Sheets

(56) References Cited

U.S. PATENT DOCUMENTS

| | | | |
|---|---|---|---|
| 7,707,312 B2 * | 4/2010 | Rose et al. | 709/245 |
| 7,774,401 B2 * | 8/2010 | Miwa et al. | 709/201 |
| 2002/0152323 A1 | 10/2002 | Ono et al. | |
| 2005/0015498 A1 * | 1/2005 | Okazawa et al. | 709/227 |
| 2005/0041665 A1 * | 2/2005 | Weyman et al. | 370/390 |
| 2005/0141018 A1 * | 6/2005 | Oak et al. | 358/1.15 |
| 2005/0200883 A1 * | 9/2005 | Mannion | 358/1.15 |

FOREIGN PATENT DOCUMENTS

| | | |
|---|---|---|
| JP | 09-181760 A | 7/1997 |
| JP | 09-200241 A | 7/1997 |
| JP | 2002-314569 A | 10/2002 |
| JP | 2004-328221 A | 11/2004 |

OTHER PUBLICATIONS

Sep. 28, 2010 Japanese Office Action that issued in Japanese Patent Application No. 2005-109221.

Dec. 4, 2009 Japanese Office Action that issued in Japanese Patent Application No. 2005-109221.

* cited by examiner

ADDRESS INFORMATION TABLE 1511

| NETWORK ADDRESS | PHYSICAL ADDRESS |
|---|---|
| : | : |
| 192.168.1.xxx | 00:01:02:03:04:pp |
| 192.168.1.yyy | 00:12:34:56:78:qq |
| : | : |

FIG. 4

ADDRESS INFORMATION TABLE  1611

| NETWORK ADDRESS | PHYSICAL ADDRESS |
|---|---|
| ⋮ | ⋮ |
| 192.168.1.www | 00:04:03:02:01:rr |
| 192.168.1.zzz | 00:87:65:43:21:mm |
| ⋮ | ⋮ |

COMMUNICATION APPARATUS AND COMMUNICATION CONTROL METHOD

FIELD OF THE INVENTION

This invention relates to a communication apparatus connected to a network for sending and receiving data via the network, and to a method of controlling communication in this apparatus.

BACKGROUND OF THE INVENTION

A network environment that supports business and office environments often includes network devices of various types having different functions and capabilities or network devices of a different generation, examples of which are printers equipped with a network function. As new technologies emerge and new-model or next-generation network devices having improved functionality become more widespread, the functions capable of being used in such networks undergo a major change. However, a situation can arise in which the same network contains a mixture of new printers capable of supporting secure printing and old-type printers that support no secure printing whatsoever. When such a condition exists, the functionality of the overall network cannot be considered to be improved.

It is preferred that new techniques and improvements thereof be implemented across an entire network and that all users of the network be capable of using the same functions with regard to all network devices.

One method of solving this problem is to simply replace all old network devices with new network devices having the desired new functions and capabilities. However, labor and expense involved when this solution is implemented are great and the solution is not realistic in a case where a new enterprising application that requires new functions and capabilities is implemented frequently.

Another method of solving the problem is to download new firmware to each old network device to thereby upgrade the version of the old network device (see the specification of Japanese Patent Application Laid-Open No. 06-214929). With this method, however, the network administrator or service manager must physically access each old network device and download the version of the software that is appropriate for each network device, and this network device must be able to support functions that are harmonized with the new network devices. This requires considerable labor. Further, in many cases an old network device has limitations in terms of hardware or design. As a consequence, there is the possibility that firmware of a new version for implementing new functions cannot be downloaded.

A further method of solving the problem is to use a network module that is connectable to an old network device via an interface and that can support desired additional functions for the old network device. A specific example of such a network module that can be mentioned is an intelligent network-card module that is connectable to a printer via an interface. The network-card module is an intelligent module equipped with its own CPU. A network-card module usually is provided with a print server function that implements overall control of various print services via a network. As a result, a printer and a network-card module communicate with each other via an interface and implement desired services. This makes it possible to shift the heavy burden of functions such as image processing from the printer to the network-card module. As a result, the functions of the CPU of the printer proper and of the peripheral circuits can be diminished in relative terms, thereby lowering the cost of the printer proper.

The network-card module and printer each communicate asynchronously using a network protocol such as TCP/IP with a communication terminal of a host computer or the like, which exists on the network, via a physical interface with which the network-card module is equipped. With the TCP/IP protocol, all terminals on the network are identified uniquely by two addresses, namely a network address (e.g., an IP address), and a specific physical address [e.g., a MAC (Media Access Control) address]. The network address is assigned by the network administrator systematically in conformity with the network configuration. The physical address is a specific address assigned at the time of manufacture of the terminal. In the case mentioned above, the network-card module and the printer use the same network address and the same physical address. This means that, when viewed from another communication terminal on the network, the printer and the network-card module are recognized as a single communication terminal on the network. This makes it possible for a service such as a print server function with which the network-card module is provided to act just as if it were a service added to the printer proper or furnished as an extension. It should be noted that when data is transmitted from any terminal on a network to another terminal, two addresses are required, namely a network address and a physical address of the destination. However, at the moment transmission starts at the terminal that is the source of the transmission, often the physical address of the transmission-destination terminal is unknown. As a consequence, the transmission-source terminal acquires the physical address of the transmission-destination terminal using an ARP (Address Resolution Protocol). The address resolution protocol is a protocol used between communication terminals on a network in order to ascertain, from the network address of the communicating party, the specific physical address that corresponds to this party.

The IETF (Internet Engineering Task Force), which is an Internet standardizing organization, has stipulated address resolution protocol specifications by the "Ethernet Address Resolution Protocol" of RFC826. An overview of address resolution processing according to the address resolution protocol will now be described in brief.

When data is transmitted in accordance with the TCP/IP protocol, the transmission-source communication terminal first searches an address information table within a cache memory using the network address of the other party as a key, investigates whether the physical address corresponding to the network address has been registered and, if the address has been registered, sets the physical address thereof as the destination address of the transmit data. If the corresponding physical address does not exist, the transmission-source communication terminal transmits an address-resolution request message (ARP request), which requests the physical address corresponding to the target network address, to all terminals on the network by broadcast. Upon receiving this address-resolution request message, each terminal on the network determines whether the target network address included in the received address-resolution request message matches the network address that has been assigned to itself and, if a match is found, sends an address-resolution response message (ARP reply), in which its own physical address has been planted, back to the terminal that is the source of transmission of the address-resolution request message. When the terminal that is the transmission source receives the address-resolution response message, the terminal registers, in its own address information table, the corresponding relationship between the network address that has been planted in the address-resolution response message and the physical address and uses this address information when a transmission of data to the relevant terminal is made from this time onward. If in the processing set forth above the target network address included in the received address-resolution request message does not match the network address that has been assigned to itself, then each terminal on the network that has received the address-resolution request message discards the received address-resolution request message and does not send back a reply to the address-resolution request message.

There are instances where a network-card module and a printer are individually equipped independently with an address resolution processor that executes address resolution using the above-described address resolution protocol. There are also instances where these are individually equipped independently with an address information table for registering the corresponding relationship between network address and physical address. Consequently, in a network-card module, for example, if data is transmitted to a client such as a host computer on a network, the module first searches an address information table, with which it itself is provided, using the network address of the client as a key, and attempts address resolution. If the relevant information has not been registered in the address information table, the module transmits an address-resolution request message to all terminals on the network by broadcast. If an address-resolution response message is received from the client in response to the address-resolution request message, then the network-card module registers the corresponding relationship between the network address and the physical address of the client in its own address information table. Similarly, in the printer, if data is transmitted to a client such as a host computer on a network, the printer first searches an address information table, with which it itself is provided and attempts address resolution. If the result is that address resolution has not been acquired, then the printer attempts address resolution by the address-resolution request message. If the address-resolution response message to the address-resolution request message is acquired, then the printer registers the corresponding relationship between the network address and physical address of the client in its own address information table.

In a case where a network-card module and printer each have their own independent, separate address information tables, as mentioned above, even in case of address information that is not stored in an address information table of the printer, there is a possibility that this address information will have been registered in the address information table of the network-card module. In such case the fact that the address-resolution request message generated by the printer will be transmitted by broadcast on the network is undesirable because it increases the line load of the network. Another problem is that address resolution in the printer takes time.

Further, a case is conceivable in which a network-card module and a printer perform address resolution using an address resolution processor provided independently and separately in each and an address information table provided independently and separately in each. In such case the network-card module and printer judge by their own address resolution processors whether an address-resolution request message is destined for their own network address. If the decision is affirmative, the address-resolution response message is transmitted to the transmission source of the address-resolution request message. If the decision is negative, the series of address resolution processing operations that discards the address-resolution request message is executed. Consequently, if an address-resolution request message is destined for their own network addresses, the address-resolution response message is transmitted redundantly from the address resolution processors provided in respective ones of the network-card module and printer. Further, the fact that the network-card module and printer execute address resolution processing redundantly in response to the same address-resolution request message, is undesirable also in terms of the processing efficiency of the overall network.

SUMMARY OF THE INVENTION

Accordingly, an object of the present invention is to solve the drawbacks of the prior art set forth above.

Another object of the present invention is to provide a communication apparatus and method of controlling communication that make it possible to alleviate operating load in address resolution processing.

According to the present invention, there is provided with a communication apparatus, which is connected to a network, for sending and receiving data via the network, comprising:

a network interface unit configured to connect to the network;

an interface unit configured to connect to a data processing terminal;

a registration unit configured to register corresponding relationship between network addresses and physical addresses of network terminals on the network;

a discrimination unit configured to determine whether a physical address corresponding to a target network address of an address-resolution request message has been registered in the registration unit, in a case where the address-resolution request message is received from the data processing terminal via the interface unit, wherein the target network address corresponds to a physical address for which the address-resolution request message requests;

a response transfer unit configured to transfer an address-resolution response message that includes the corresponding physical address to the data processing terminal via the interface unit, in a case where the discrimination unit determines that the corresponding physical address has been registered in the registration unit; and a request transfer unit configured to transmit the address-resolution request message to the network via the network interface unit, in a case where the discrimination unit determines that the physical address has not been registered in the registration unit.

According to the present invention, there is provided with a communication control method in a communication apparatus, which is connected to a network, for sending and receiving data via the network, the method comprising:

a registration step of registering, in memory, corresponding relationship between network addresses and physical addresses of network terminals on the network;

in a case where an address-resolution request message is transmitted from a data processing terminal, a discrimination step of determining whether a physical address corresponding to a target network address of the address-resolution request message has been registered in the memory, wherein the target network address corresponds to a physical address which the address-resolution request message requests;

a response message transfer step of transferring an address-resolution response message that includes the corresponding physical address to the data processing terminal if it is determined in the discrimination step that the corresponding physical address has been registered; and a request message transfer step of transmitting the address-resolution request message to the network if it is determined in the discrimination step that the corresponding physical address has not been registered.

The features of the invention are achieved by a combination of the features set forth in the independent claims, while the dependent claims define specific advantageous examples of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Preferred embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

Figure 1:
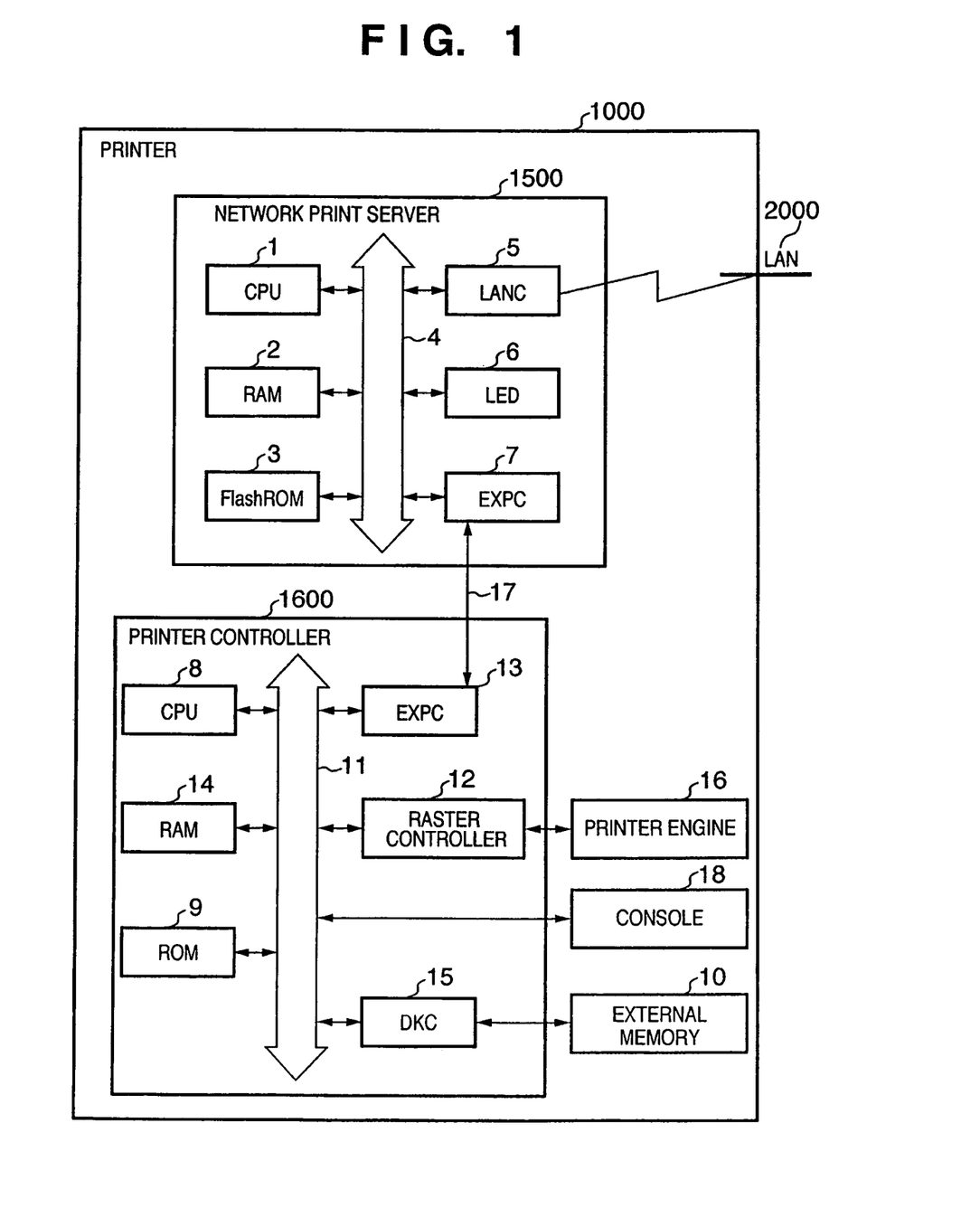
FIG. 1 is a block diagram for describing a printer according to an embodiment of the present invention.

FIG. 1 is a block diagram for describing the structure of a printer 1000 according to an embodiment of the present invention. The printer 1000 comprises devices that administer a control system comprising a network print server (abbreviated simply as "print server" below) 1500 and a printer controller (abbreviated simply as "controller" below) 1600.

The structure of the print server 1500 will be described first. A CPU 1 controls the operation of components, which are connected to a system bus 4, based upon a control program that has been stored in a rewritable flash memory (flash ROM) 3. Also stored in the flash memory 3 is a program for executing address resolution processing indicated by flowcharts illustrated in FIGS. 5 and 6, described later. Using a plurality of external devices such as a host computer connected to a local-area network (LAN) 2000, as well as a prescribed network communication protocol, a network controller (LANC) 5 sends and receives print data sent from an external unit and various data such as print control instructions, etc. An extension interface controller (EXPC) 7 sends and receives data to and from the controller 1600 connected via an extension interface 17. A RAM 2, which is used as the main memory of CPU 1, is employed as a temporary storage area such as a work area when control processing is executed by the CPU 1. LEDs 6 are used as a display unit that indicates the operating status of the print server 1500. For example, various operating states such as the state of electrical connection (link) between the network controller (LANC) 5 and the local-area network (LAN) 2000 and the network communication mode (10Base or 100Base, full duplex or half duplex) can be indicated by the flashing pattern or colors of the LEDs 6. Furthermore, the extension interface 17 connecting the print server 1500 with the controller 1600 is constituted by a connector. Thus the arrangement is such that solely the print server 1500 can be attached and detached, and the print server 1500 can be attached to another printer 1000 having the same structure.

The structure of the controller 1600 will be described next. A CPU 8 implements overall control of access to various devices, which are connected to a system bus 11, based upon a control program that has been stored in a ROM 9, or a control program that has been stored in an external memory 10 connected via a disk controller (DKC) 15, and resource data (resource information), etc. An extension interface controller (EXPC) 13 receives print data supplied from the print server 1500 via the interface 17. A raster controller 12 generates image information based upon the print data and outputs an image signal to a printer engine 16. A RAM 14 that functions as a main memory or work area, etc., of the CPU 8 is so adapted that memory capacity can be expanded by optional RAM connected to an expansion port, which is not shown. A console 18 has buttons for performing various operations such as setting of the operating mode, etc., of the printer 1000 and canceling of print data, and a display unit such as a liquid crystal panel or LEDs for indicating the operating status of the printer 1000. It should be noted that the printer engine 16 utilizes a well-known printing technique, examples of which are an electro-photographic method, laser method, ink-jet method and thermal transfer.

Figure 2:
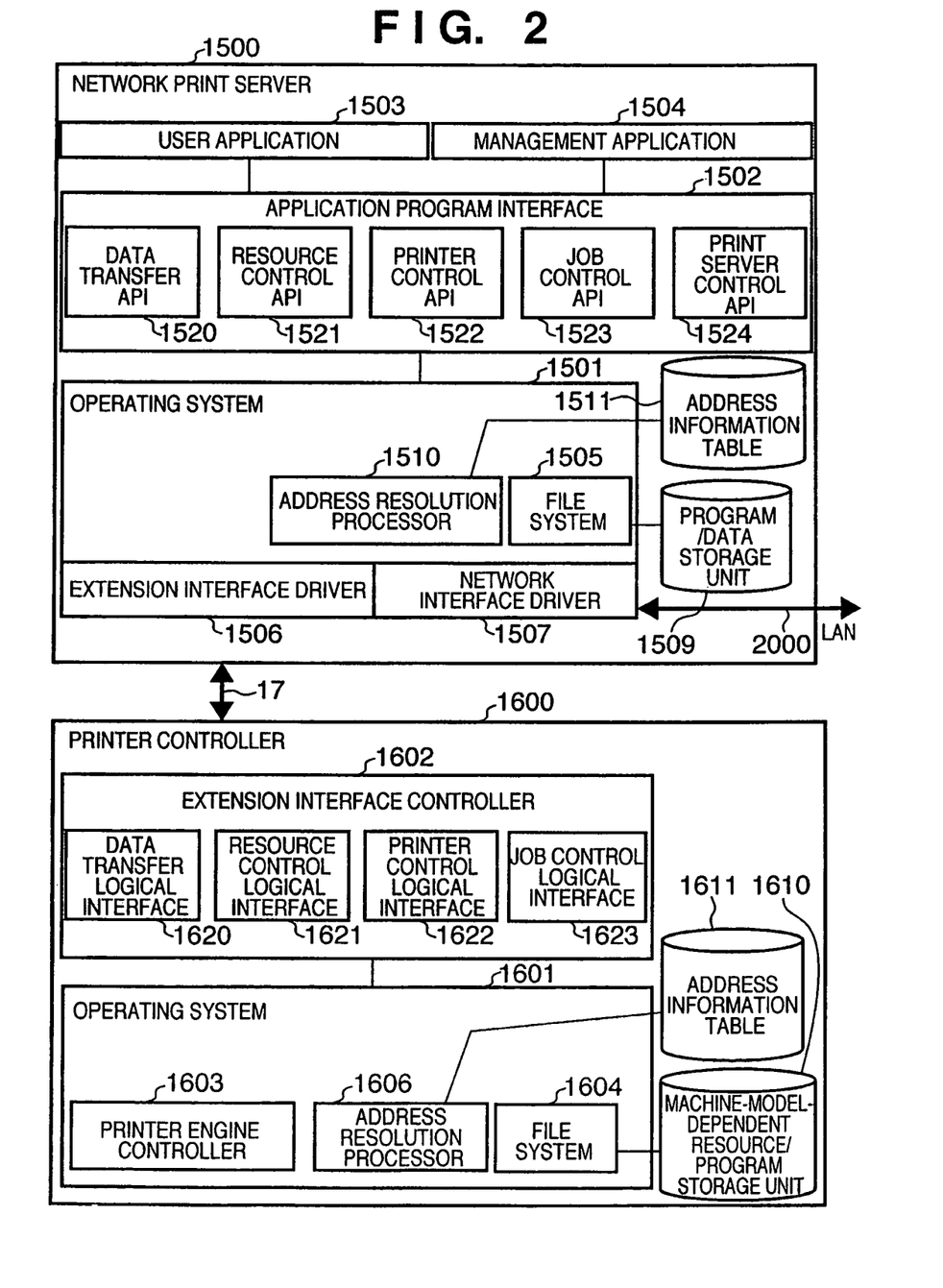
FIG. 2 is a block diagram useful in describing the structure of software in a control program stored in a storage device in each of a network print server and printer controller, which are control devices in a printer according to an embodiment of the present invention.

FIG. 2 is a block diagram useful in describing the software structures of control programs that have been stored in storage devices of respective ones of the print server 1500 and controller 1600, which are control devices in the printer 1000 according to this embodiment of the invention. It should be noted that these control programs are analyzed and the processing thereof executed by the CPUs (1, 8) of respective ones of the control devices.

The structure of the software of print server 1500 will be described first. An operating system 1501 is an operating system (OS) that exercises basic input/output control of data in the print server 1500. The operating system 1501 further includes a file system 1505 for exercising input/output control of a program/data storage unit 1509; an extension interface driver 1506 for controlling communication via the controller 1600 and extension interface 17; a network interface driver 1507 for communicating with an external unit such as a host computer (not shown in FIG. 1) via the communication medium of the LAN 2000; and an address resolution processor 1510 for controlling an address information table 1511 and executing address resolution processing.

Figure 5:
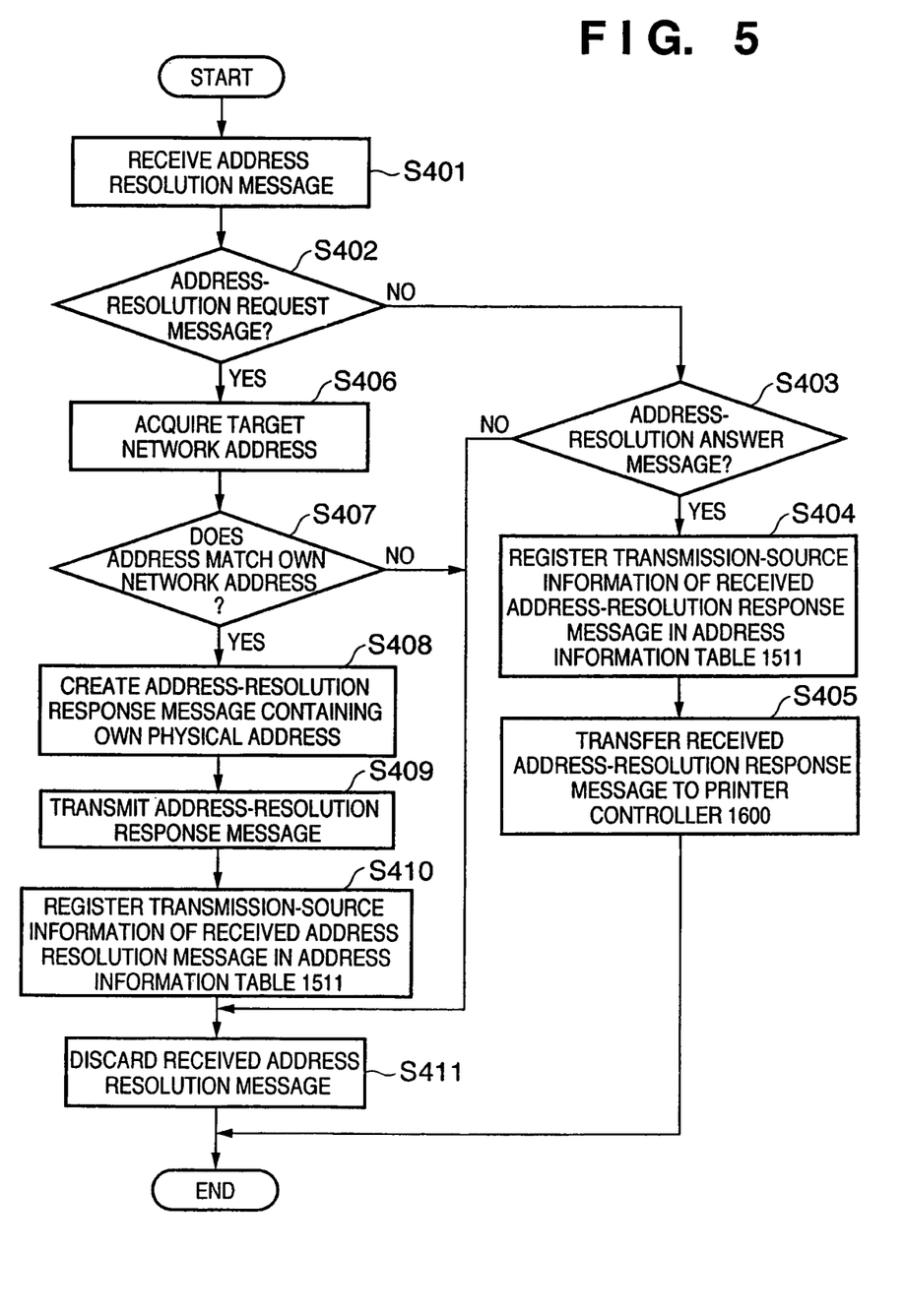
FIG. 5 is a flowchart useful in describing processing for receiving an address resolution message executed by an address resolution processor that operates in a network print server according to the embodiment.
Figure 6:
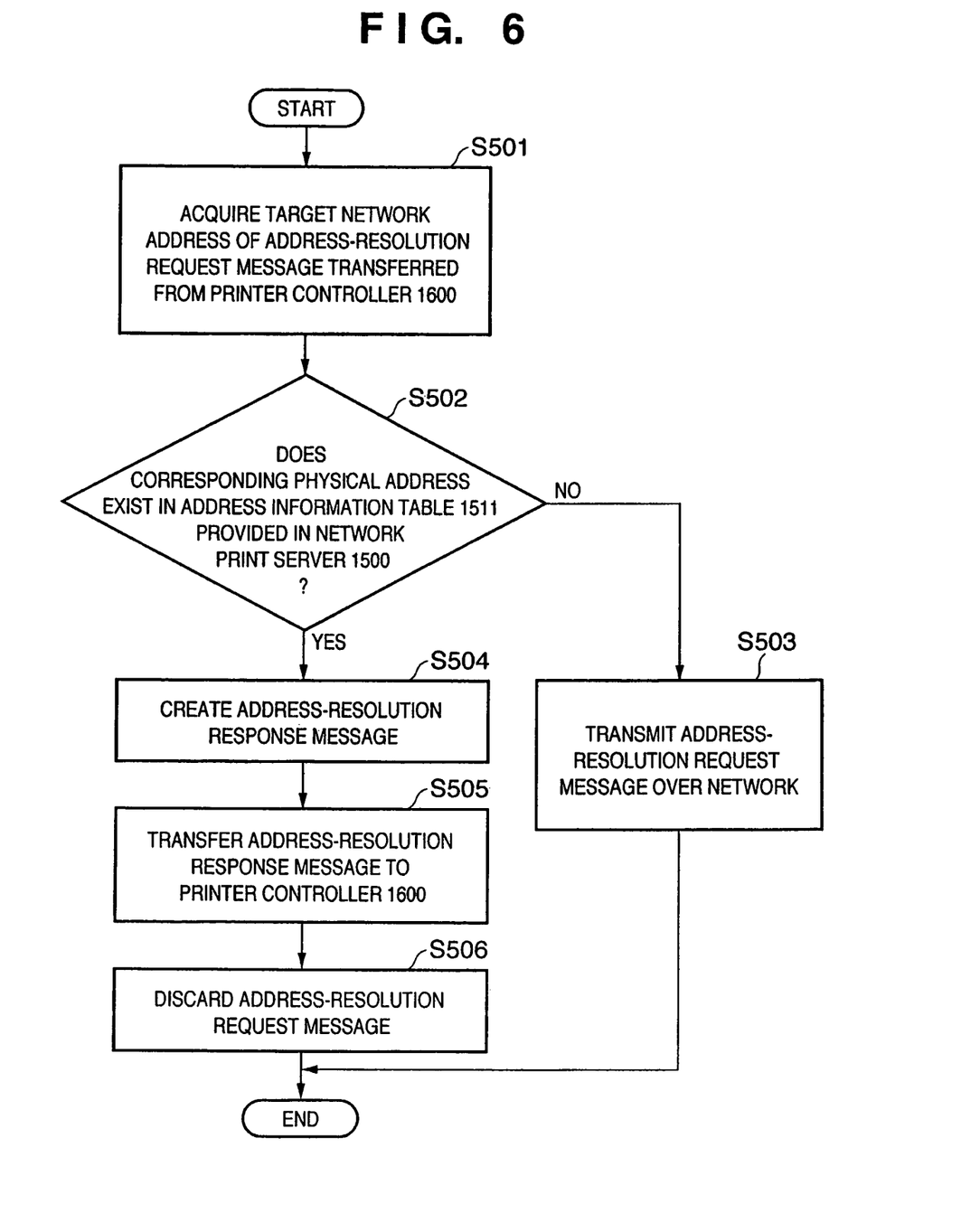
FIG. 6 is a flowchart useful in describing processing for receiving an address resolution message executed by an address resolution processor that operates in a network print server according to the embodiment, this being processing in a case where an address-resolution request message has been received from a printer controller.

A characterizing feature of this embodiment is that the address resolution processor 1510 is capable of executing the address resolution processing illustrated in both of the flowcharts of FIGS. 5 and 6.

An application program interface (API) 1502 provides various functions possessed by the operating system 1501 to application programs such as a user application 1503 that runs on the print server 1500 and a management application 1504 for registering and managing the printer 1000 and user applications. Examples of functions provided by the application program interface 1502 are a data transfer API 1520 that provides a print-data transceive function; a resource control API 1521 that controls input/output of resource data such as bitmap images and display messages; a printer control API 1522 that controls restart of the printer 1000 as well as initialization and setting of setting values; a job control API 1523 for controlling print-job cancellation and repetitive print commands; and a print server control API 1524 for restarting the print server 1500, initializing of setting values and the setting thereof, start-up of application programs, registration and deletion.

The structure of the software of controller 1600 will be described next. An operating system 1601 that exercises various processing control of the controller 1600 includes a printer engine controller 1603 that controls communication with the printer engine 16; a file system 1604 for controlling input/output of a machine-model-dependent resource/program storage unit 1610 that stores machine-model-dependent resources such as bitmap images and error messages to which reference is had from the print server 1500, and machine-model-dependent application programs that run on the controller 1600; and an address resolution processor 1606 for controlling an address information table 1611 and executing address resolution processing.

An extension interface controller 1602 controls communication with the print server 1500 via the extension interface 17. The extension interface controller 1602 is equipped with a data transfer logical interface 1620 that controls input/output of print data a per-control-type basis; a resource control logical interface 1621 that controls input/output of various data that has been stored in the machine-model-dependent resource/program storage unit 1610; a printer control logical interface 1622 that controls restart of the printer 1000 as well as initialization of setting values and the setting thereof; and a job control logical interface 1623 for controlling print-job cancellation and repetitive print commands. The extension interface controller 1602 transfers instructions, which have been requested from the print server 1500 via each of the logical interfaces, to the operating system 1601, and sends the results of processing back to the print server 1500.

Figure 3:
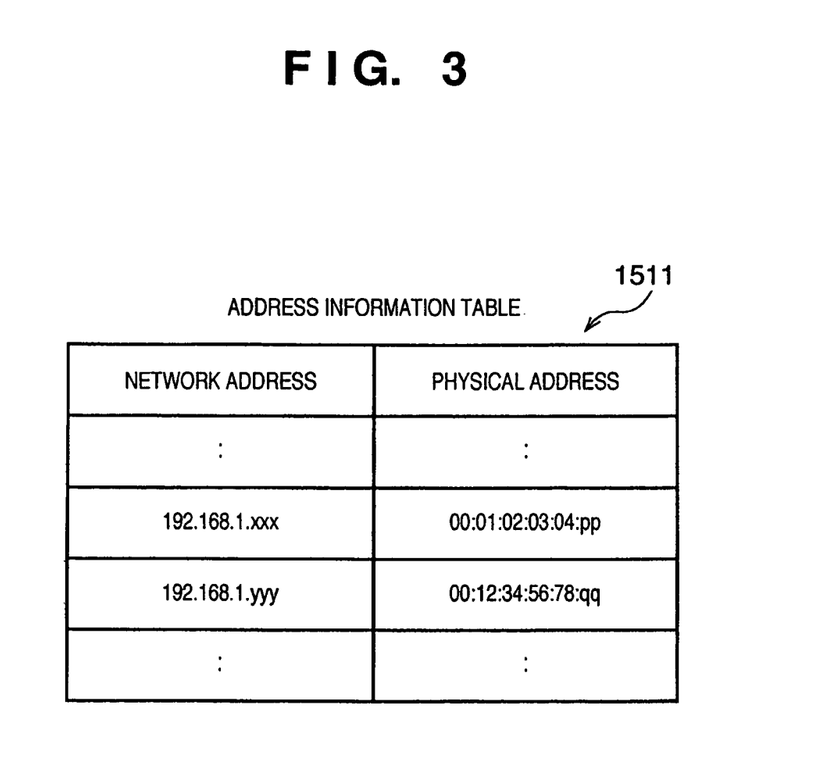
FIG. 3 depicts a view illustrating an example of the data structure of an address information table with which a network print server according to the embodiment is equipped.

FIG. 3 is a diagram illustrating an example of the data structure of the address information table 1511 according to this embodiment. The address information table 1511 is kept in the RAM 2 of print server 1500. Network addresses of external units such as a host computer (not shown in FIG. 1) connected to the LAN 2000 and the physical addresses of the external units have been stored in correspondence in the address information table 1511. The network address and the physical address stored in the address information table 1511 are acquired by the address resolution processing. Here IP addresses have been stored as the network addresses and MAC addresses as the physical addresses.

Figure 4:
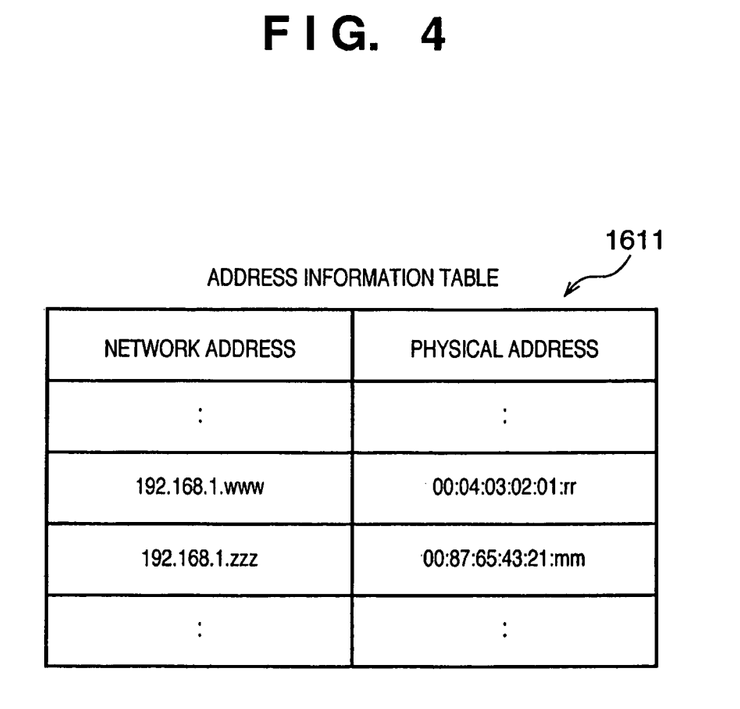
FIG. 4 depicts a view illustrating an example of the data structure of an address information table with which a printer controller according to the embodiment is equipped.

FIG. 4 is a diagram illustrating an example of the data structure of the address information table 1611 according to this embodiment. The address information table 1611 is kept in the RAM 14 of printer controller 1600. Network addresses and physical addresses (acquired by address resolution processing) of external units such as a host computer connected to the LAN 2000 have been stored in correspondence in the address information table 1611. Here IP addresses have been stored as the network addresses and MAC addresses as the physical addresses.

FIG. 5 is a flowchart useful in describing processing for receiving an address resolution message. The processing is executed by the address resolution processor 1510 that operates in the network print server 1500 according to this embodiment. Here step numbers S401 to S411 indicate various processing steps. Operation is described based upon the flow of processing by the address resolution processor 1510 in the print server 1500 in a case where an address resolution message to the printer 1000 is received from an external unit such as a host computer connected to the LAN 2000. It should be noted that the control procedure corresponding to each of these steps has been stored in the flash memory 3 of the print server 1500.

First, an address resolution message that has been transmitted to the printer 1000 is received at step S401 from an external unit such as a host computer connected to the LAN 2000. Control then proceeds to step S402. Here the address resolution processor 1510 acquires header information from the received address resolution message and determines whether this address resolution message is an address-resolution request message (ARP request). If the message is not the address-resolution request message, then control proceeds to step S403, where the address resolution processor 1510 determines whether the address resolution message is an address-resolution response message (ARP reply). If the message is not the address-resolution response message, then the address resolution processor 1510 judges that the address resolution message received at step S401 is an invalid message. Control then proceeds to step S411, where the processor discards the received address resolution message and exits processing.

On the hand, if the message is found to be the address-resolution response message at step S403, then control proceeds to step S404, where the address resolution processor 1510 acquires the network address and physical address of the terminal that is the transmission source and then registers the acquired network address and physical address in correspondence with each other in the address information table 1511 provided in the print server 1500. Control then proceeds to step S405, whereby the processor 1510 transfers the received address-resolution response message to the printer controller 1600 via the extension interface 17 and thenceforth terminates processing.

If it is determined at step S402 that the address resolution message received at step S401 is an address-resolution request message, control proceeds to step S406. Here the address resolution processor 1510 acquires the target network address of the address-resolution request message received. The target network address of the address-resolution request message corresponds to a physical address which the address-resolution request message requests. Then, at step S407, the processor 1510 determines whether the target network address acquired matches its own network address. If the two do not match, then the processor 1510 judges that the message is not an address-resolution request message directed to itself and control proceeds to step S411, where the processor discards the received address-resolution request message and exits processing.

On the other hand, if the address resolution processor 1510 determines that the target network address matches its own network address at step S407, then it creates an address-resolution response message, which contains the physical address possessed by the print server 1500, at step S408. Next, at step S409, the processor 1510 transmits the address-resolution response message to the terminal (sender terminal), which is the source of transmission of this address-resolution request message, via the LAN 2000. This is followed by step S410, at which the processor 1510 acquires the network address and physical address of the sender terminal from the received address-resolution request message and registers these addresses in the address information table 1511 provided in the print server 1500. Control then proceeds to step S411, where the address resolution processor 1510 discards the received address-resolution request message and terminates processing.

FIG. 6 is a flowchart useful in describing processing for receiving an address resolution message. The processing is executed by the address resolution processor 1510 that operates in the print server 1500 according to this embodiment. Here step numbers S501 to S506 indicate various processing steps. Operation is described based upon the flow of processing by the address resolution processor 1510 in a case where an address-resolution request message (ARP request) has been transferred from the controller 1600 via the extension interface 17 to the print server 1500. It should be noted that the control procedure corresponding to each of these steps has been stored in the flash memory 3 of the print server 1500.

First, at step S501, the address resolution processor 1510 acquires the target network address of the address-resolution request message transferred from the controller 1600 via the extension interface 17. The target network address of the address-resolution request message corresponds to a physical address which the address-resolution request message requests. Next, at step S502, the processor 1510 searches the address information table 1511 provided in the print server 1500 and judges whether the physical address corresponding to this target network address has been registered in the table 1511. If this physical address has not been registered, control proceeds to step S503. Here, the address resolution processor 1510 transmits by broadcast the address-resolution request message, which has been transferred from the controller 1600 via the extension interface 17, to the external units such as a host computer on the LAN 2000 and thenceforth exits processing.

On the other hand, if it is found at step S502 that the physical address corresponding to the target network address has been registered in the address information table 1511, then the address resolution processor 1510 creates an address-resolution response message containing the physical address that corresponds to the target network address. This is followed by step S505, at which the address-resolution response message created at step S504 is transferred to the controller 1600 via the extension interface 17. Then, at step S506, the processor 1510 discards the address-resolution request message that has been transferred from the controller 1600 via the extension interface 17. Processing is then exited.

Figure 7:
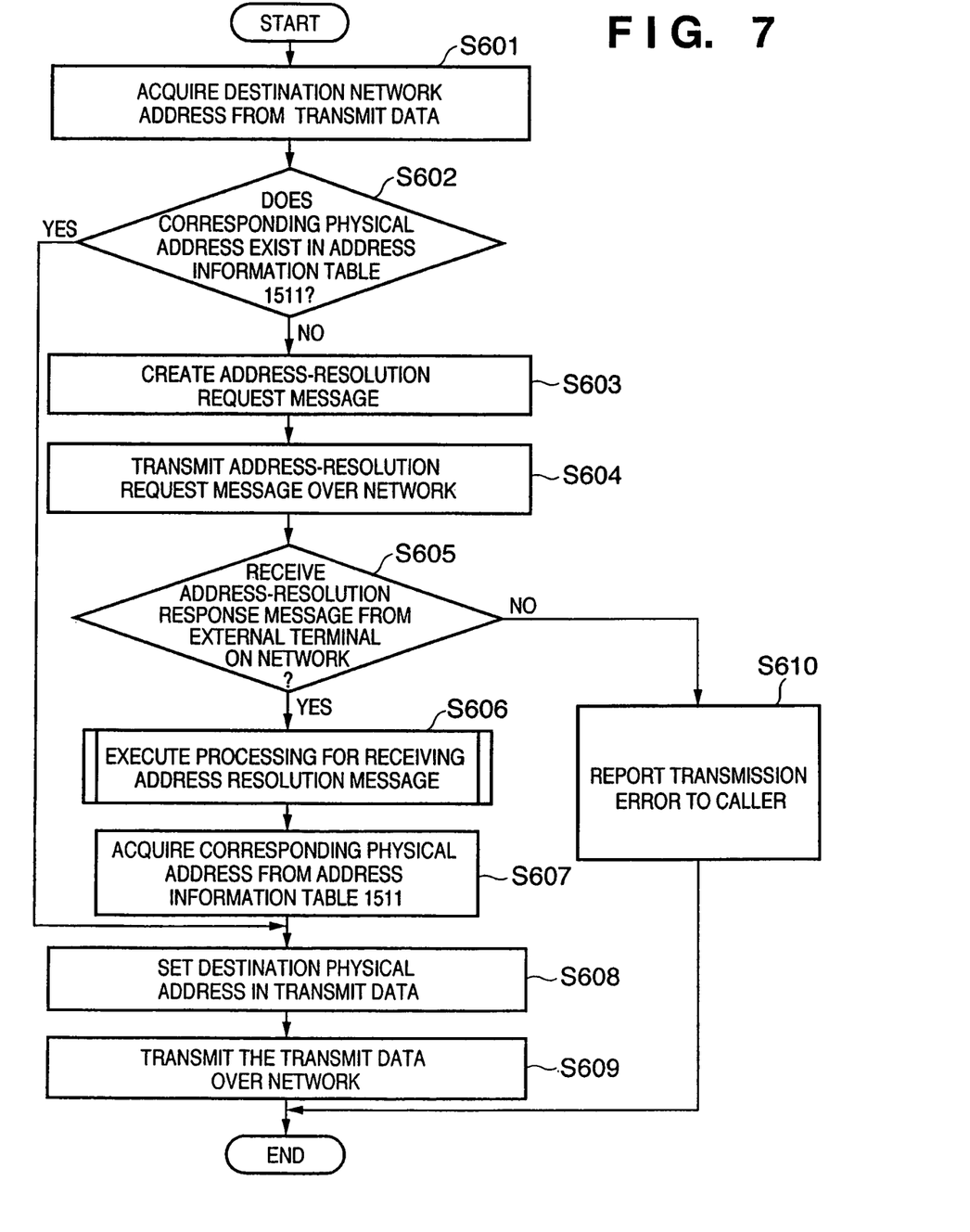
FIG. 7 is a flowchart useful in describing processing for transmitting an address-resolution request message executed by an address resolution processor that operates in a network print server according to the embodiment.

FIG. 7 is a flowchart useful in describing processing for transmitting an address-resolution request message (ARP request). This processing is executed by the address resolution processor 1510 that operates in the print server 1500 according to this embodiment. Here step numbers S601 to S610 indicate various processing steps. Operation is described based upon the flow of processing by the address resolution processor 1510 in a case where transmit data directed to an external unit such as a host computer on the LAN 2000 has been delivered from the user application 1503. It should be noted that the control procedure corresponding to each of these steps has been stored in the flash memory 3 of the print server 1500.

First, at step S601, the address resolution processor 1510 receives transmit data directed to an external unit such as a host computer on the LAN 2000, the data having been delivered from the user application 1503, etc., that runs on the print server 1500. The address resolution processor 1510 acquires the network address of the destination of the transmit data, the network address being contained in the data. Next, at step S602, the processor 1510 searches the address information table 1511 provided in the print server 1500 and judges whether the physical address corresponding to this acquired network address has been registered in the table. If this physical address has been registered, control proceeds to step S608 and the processor 1510 plants this physical address in the header of the transmit data. This is followed by step S609, at which the processor 1510 transmits the transmit data to the external unit, such as a host computer on the LAN 2000, and exits processing.

On the other hand, if it is found at step S602 that the physical address corresponding to the network address acquired in step S601 has not been registered in the address information table 1511, then control proceeds to step S603. Here the processor 1510 creates an address-resolution request message in order to inquire about the physical address corresponding to the network address acquired in step S601. Then, at step S604, the processor 1510 transmits by broadcast the address-resolution request message, which has been created at step S603, to external devices such as a host computer on the LAN 2000. Control then proceeds to step S605, where the address resolution processor 1510 waits for receipt of an address-resolution response message (ARP reply) to the address-resolution request message transmitted at step S604. If an address-resolution response message is not received at step S605 upon elapse of a prescribed period of time, then control proceeds to step S610. Here the processor 1510 reports a transmission error to the user application 1503, which is the source of the request to transmit the transmit data. Processing is then terminated.

If an address-resolution response message to the address-resolution request message transmitted at step S604 is received at step S605, then control proceeds to step S606 and the address resolution processor 1510 executes processing for receiving the address resolution message. More specifically, the processor 1510 executes the processing steps S401 to S411 of FIG. 5 described above. Control then proceeds to step S607. Here the processor 1510 searches the address information table 1511 provided in the network print server 1500 and acquires the physical address that corresponds to the network address acquired at step S601. This is followed by step S608, at which the processor 1510 plants the acquired physical address in the header of the transmit data. Next, at step S609, the processor 1510 transmits the transmit data to an external unit such as a host computer on the LAN 2000 and terminates processing.

Figure 8:
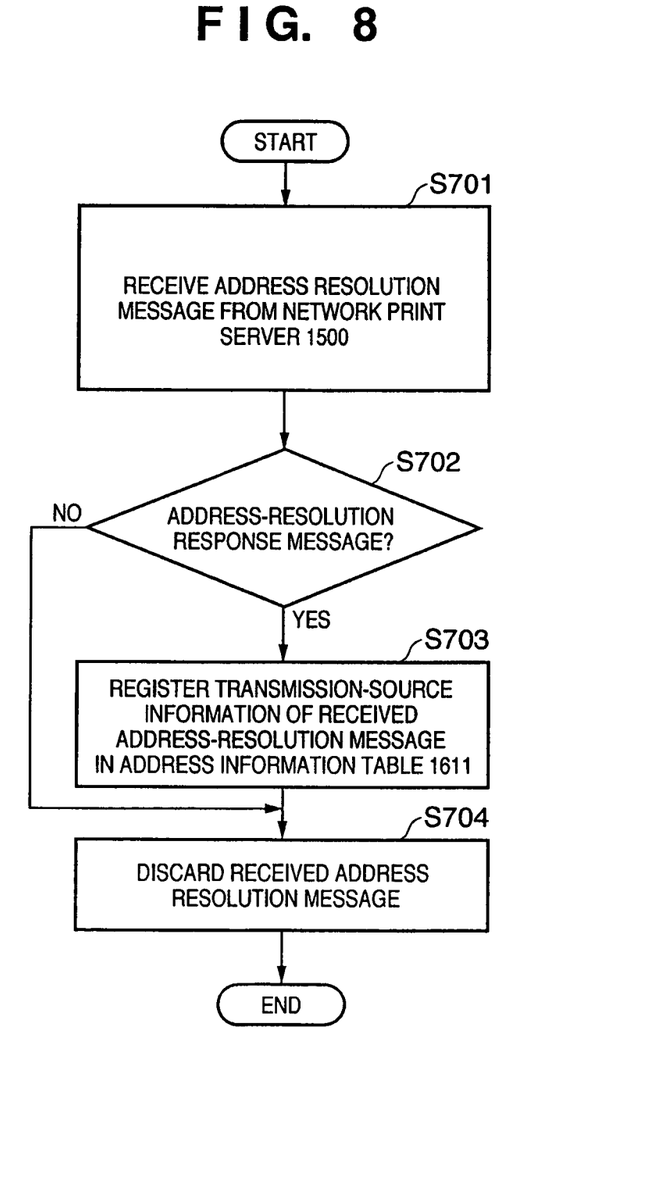
FIG. 8 is a flowchart useful in describing processing for receiving an address resolution message executed by an address resolution processor that operates in a printer controller according to the embodiment.

FIG. 8 is a flowchart useful in describing processing for receiving an address resolution message. This processing is executed by the address resolution processor 1601 that operates in the controller 1600 according to this embodiment. Here step numbers S701 to S704 indicate various processing steps. Operation is described based upon the flow of processing by the address resolution processor 1606 in the controller 1600 in a case where an address resolution message has been transferred from the print server 1500 via the extension interface 17 to the controller 1600. It should be noted that the control procedure corresponding to each of these steps has been stored in the ROM 9 of the controller 1600.

First, when an address resolution message is received from the print server 1500 via the extension interface 17 at step S701, control proceeds to step S702 and the address resolution processor 1606 acquires header information from the received address resolution message and determines whether this address resolution message is an address-resolution response message (ARP reply). If the message is not the address-resolution response message, then the processor 1606 judges that the address resolution message received at step S701 is an invalid message. Control then proceeds to step S704 and the processor 1606 discards the received address resolution message and terminates processing. As has been described in relation to FIG. 5 set forth above, in order that an address-resolution request message (ARP request) that has been transmitted to the printer 1000 from an external unit, such as a host computer connected to the LAN 2000, will be processed by the address resolution processor 1510 that operates in the print server 1500, the message (ARP request) is not transferred to the address resolution processor 1606 that operates in the controller 1600.

On the other hand, if it is determined at step S702 that the message is an address-resolution response message, then control proceeds to step S703 and the processor 1606 acquires the network address and physical address of the sender terminal from the received address-resolution response message. Next, the address resolution processor 1606 registers the acquired network address and physical address in correspondence with each other in the address information table 1611. Control then proceeds to step S704, at which the processor 1606 discards the received address-resolution response message and exits processing.

Figure 9:
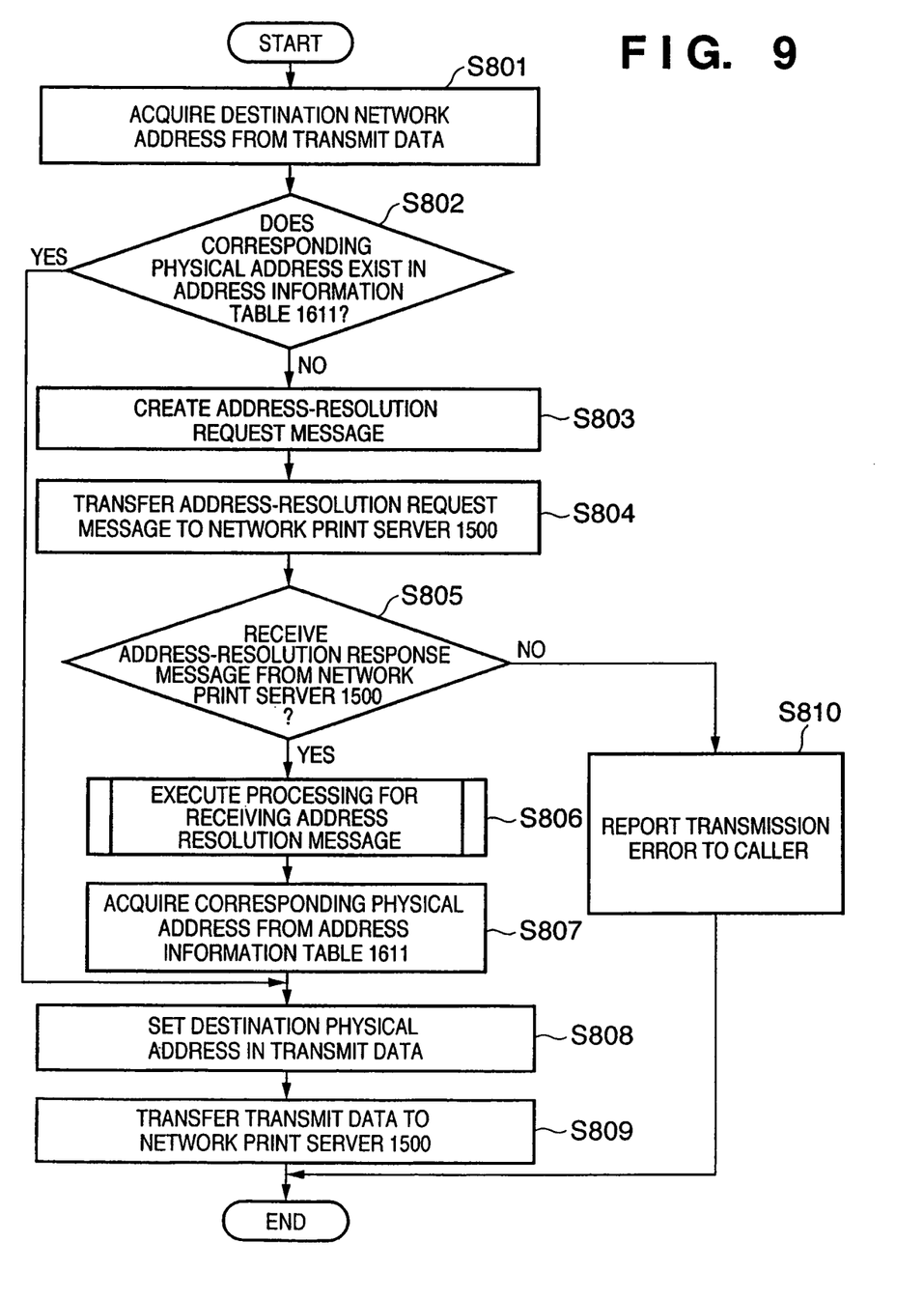
FIG. 9 is a flowchart useful in describing processing for transmitting an address-resolution request message executed by an address resolution processor that operates in a printer controller according to the embodiment.

FIG. 9 is a flowchart useful in describing processing for transmitting an address-resolution request message (ARP request). This processing is executed by the address resolution processor 1606 that operates in the controller 1600 according to thus embodiment. Here step numbers S801 to S810 indicate various processing steps. Operation is described based upon the flow of processing by the address resolution processor 1606 in a case where transmit data directed to an external unit such as a host computer on the LAN 2000 has been delivered from the machine-model-dependent application program, etc., that runs on the controller 1600. It should be noted that the control procedure corresponding to each of these steps has been stored in the ROM 9 of the controller 1600.

First, at step S801, the address resolution processor 1606 acquires the destination network address from transmit data directed to an external unit such as a host computer on the LAN 2000, the data having been delivered from machine-model-dependent application program that runs on the controller 1600. Next, at step S802, the processor 1606 searches the address information table 1611 provided in the controller 1600 and judges whether the physical address corresponding to this network address acquired in the step S801 has been registered in the table. If this physical address has been registered, control proceeds to step S808 and the processor 1606 plants this physical address in the header of the transmit data. This is followed by step S809, at which the processor 1606 transmits the transmit data to the print server 1500 via the extension interface 17 and exits processing.

On the other hand, if the physical address corresponding to the network address acquired in step S801 has not been registered in the address information table 1611, control proceeds to step S803 and the address resolution processor 1606 creates an address-resolution request message in order to inquire about the corresponding physical address. Then, at step S804, the processor 1606 transfers the address-resolution request message, which has been created at step S803, to the print server 1500 via the extension interface 17. Control then proceeds to step S805, where the address resolution processor 1606 waits for receipt of an address-resolution response message (ARP reply) to the address-resolution request message transmitted at step S804. If an address-resolution response message is not received at step S805 upon elapse of a prescribed period of time, then control proceeds to step S810. Here the processor 1606 reports a transmission error to the machine-model-dependent application program, which is the source of the request to transmit the transmit data. Processing is then terminated.

It is determined at step S805 whether an address-resolution response message to the address-resolution request message transferred at step S804 has been received. If the address-resolution response message is received, then control proceeds to step S806 and the address resolution processor 1606 executes processing for receiving the address resolution message. This processing is executed at the processing steps S701 to S704 of FIG. 8 described above. Control then proceeds to step S807, at which the processor 1606 searches the address information table 1611 provided in the controller 1600 and acquires the physical address that corresponds to the network address acquired at step S801. This is followed by step S808, at which the processor 1606 plants this physical address in the header of the transmit data. Next, at step S809, the processor 1606 transfers the transmit data to the print server 1500 via the extension interface 17 and terminates processing.

It should be noted that in a case where transmit data has been transferred to the print server 1500 from the controller 1600 via the extension interface 17, the print server 1500 transmits this transmit data to an external unit such as a host computer on the LAN 2000.

Second Embodiment

In the first embodiment, the print server 1500 may be a separate device that exists physically detached from the printer 1000. In such case the printer 1000 would be equipped internally with a control unit that administers a control system comprising the controller 1600.

In the print server 1500, the extension interface controller (EXPC) 7 illustrated in FIG. 1 may be a second controller connected to the system bus 4, and the extension interface driver 1506 illustrated in FIG. 2 may be a second network interface driver contained in the operating system 1501.

Further, in the controller 1600, the extension interface controller (EXPC) 13 illustrated in FIG. 1 may be a network controller connected to the system bus 11, and the extension interface 17 illustrated in FIGS. 1 and 2 may be a second local-area network. The print server 1500 and controller 1600 may be connected in common with this second local-area network.

There are cases where the object of the invention is attained also by supplying a software program, which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program. Accordingly, since the functional processing of the present invention is implemented by computer, the program codes per se installed in the computer also implement the present invention. In other words, the present invention also covers a computer program that is for the purpose of implementing the functional processing of the present invention. In this case, so long as the system or apparatus has the functions of the program, the form of the program, e.g., object code, a program executed by an interpreter or print data supplied to an operating system, etc., does not matter.

Examples of storage media that can be used for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc. As for the method of supplying the program, the client computer can be connected to a website on the Internet using a browser possessed by the client computer, and the computer program per se of the present invention or an automatically installable compressed file of the program can be downloaded to a storage medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiment can be implemented by this processing.

Furthermore, after the program read from a recording medium is written to a memory provided on function expansion board inserted into the computer or provided in a function expansion unit connected to the computer, a CPU or the like mounted on the function expansion board or function expansion unit performs all or a part of the actual processing so that the functions of the foregoing embodiments can be implemented by this processing.

The present invention is not limited to the above embodiments and various changes and modifications can be made within the spirit and scope of the present invention. Therefore, to apprise the public of the scope of the present invention, the following claims are made.

This application claims the benefit of Japanese Application No. 2005-109221, filed Apr. 5, 2005 which is hereby incorporated by reference herein in its entirety.

What is claimed is:

1. A communication system including a communication apparatus being capable of communicating with an external apparatus on a network and a data processing terminal being capable of communicating with the external apparatus via the communication apparatus, the data processing terminal comprising:
a first storage unit coupled to a first processor and configured to store a network address of the external apparatus and a physical address of the external apparatus by relating to each other; and the first processor including:
a first determination unit configured to determine, in a case that the data processing terminal transmits first data to the network, whether a physical address corresponding to a network address of a destination of the first data is stored in the first storage unit;
a first transfer unit configured to transfer, in a case that the first determination unit determines that the physical address is not stored in the first storage unit, an address-resolution request message for acquiring a physical address corresponding to the network address to the communication apparatus; and
a first reception unit configured to receive an address-resolution response message from the communication apparatus in response to the address-resolution request message transferred by the first transfer unit,
wherein, in a case that the first receiving unit receives the address-resolution response message, the first storage unit stores the physical address included in the address-resolution response message associated with the network address of the destination of the first data, and the communication apparatus comprising:
a second storage unit coupled to a second processor and configured to store the network address of the external apparatus and the physical address of the external apparatus by relating to each other; and the second processor including:
a second determination unit configured to determine, in a case that the communication apparatus transmits second data which is obtained from an application of the communication apparatus and which is not derived from the data processing terminal to the network, whether a physical address corresponding to a network address of a destination of the second data is stored in the second storage unit;
a transmission unit configured to transmit, in a case that the second determination unit determines that the physical address is not stored in the second storage unit, an address-resolution request message for acquiring a physical address corresponding to the network address to the network; and
a second reception unit configured to receive an address-resolution response message from the network in response to the address-resolution request message transmitted by the transmission unit,
wherein, in a case that the second reception unit receives the address-resolution response message, the second storage unit stores the physical address included in the address-resolution response message associated with the network address of the destination of the second data,
wherein the communication apparatus transfers the address-resolution response message, received by the second reception unit, corresponding to the second data to the data processing terminal,
wherein the data processing terminal stores the physical address included in the address-resolution response message transferred from the communication apparatus associated with the network address of the destination of the second data, and
wherein the communication apparatus and the data processing terminal are included in a printer.

2. The communication system according to claim 1, wherein, in a case that the first determination unit determines that the physical address is stored in the first storage unit, the data processing terminal sets the physical address stored in the first storage unit as the destination of the first data.

3. The communication system according to claim 1, wherein, in a case that the first determination unit determines that the physical address is not stored in the first storage unit, the data processing terminal sets the physical address included in the address-resolution response message received from the communication apparatus as the destination of the first data.

4. The communication system according to claim 1, wherein, in a case that the second determination unit determines that the physical address is stored in the second storage unit, the communication apparatus sets the physical address stored in the second storage unit as the destination of the second data.

5. The communication system according to claim 1, wherein, in a case that the second determination unit determines that the physical address is not stored in the second storage unit, the communication apparatus sets the physical address included in the address-resolution response message received by the second reception unit as the destination of the second data.

* * * * *